(12) United States Patent
Kisela et al.

(10) Patent No.: US 8,089,869 B2
(45) Date of Patent: Jan. 3, 2012

(54) METHOD AND APPARATUS OF DUPLICATE PACKET DETECTION AND DISCARD

(75) Inventors: James W Kisela, Snohomish, WA (US); Steven Koller, Yorktown Hts, NY (US)

(73) Assignee: Fluke Corporation, Everett, WA (US)

( * ) Notice: Subject to any disclaimer, the term of this patent is extended or adjusted under 35 U.S.C. 154(b) by 217 days.

(21) Appl. No.: 12/392,975

(22) Filed: Feb. 25, 2009

(65) Prior Publication Data

US 2009/0225676 A1  Sep. 10, 2009

Related U.S. Application Data

(60) Provisional application No. 61/035,018, filed on Mar. 9, 2008, provisional application No. 61/035,021, filed on Mar. 9, 2008.

(51) Int. Cl.
*H04L 12/26* (2006.01)

(52) U.S. Cl. ......................................... 370/229; 370/389

(58) Field of Classification Search .................. 370/229, 370/256, 389; 709/202, 207, 224, 246; 710/100; 713/100
See application file for complete search history.

(56) References Cited

U.S. PATENT DOCUMENTS

| | | | | |
|---|---|---|---|---|
| 6,064,406 | A  * | 5/2000  | Atkinson et al. | 713/100 |
| 2002/0083290 | A1 * | 6/2002  | Mocenigo | 711/202 |
| 2003/0145039 | A1 * | 7/2003  | Bonney et al. | 709/202 |
| 2005/0018668 | A1 * | 1/2005  | Cheriton | 370/389 |
| 2006/0271713 | A1 * | 11/2006 | Xie et al. | 710/100 |
| 2006/0291384 | A1 * | 12/2006 | Harris et al. | 370/229 |
| 2009/0073897 | A1 * | 3/2009  | Winter | 370/256 |

* cited by examiner

*Primary Examiner* — Andrew Lai
(74) *Attorney, Agent, or Firm* — patenttm.us

(57) ABSTRACT

Duplicate packet detection and discard employs hash values and time stamps of received packet data, wherein the hash value is employed as an index to a table, and if data at a table entry has a time stamp near a time of the packet data, a duplicate is determined.

20 Claims, 3 Drawing Sheets

METHOD AND APPARATUS OF DUPLICATE PACKET DETECTION AND DISCARD

CROSS REFERENCE TO RELATED APPLICATIONS

This application claims priority of U.S. provisional patent application 61/035,018, filed Mar. 9, 2008, and U.S. provisional patent application 61/035,021, filed Mar. 9, 2008.

BACKGROUND OF THE INVENTION

This invention relates to network test and measurement, and more particularly to an apparatus and method for detecting duplicate packets in network traffic.

In operation and maintenance of networks, determination of where issues or problem points arise can be complex. A network engineer or technician looking to resolve problems would be interested in having accurate network protocol statistics. Network analyzers that employ multiple ports may be connected to a network such that packets on a network may be seen at two or more ports of the analyzer. Misinterpreting these duplicate packets in protocol analysis can lead to erroneous statistics and false conclusions.

While it might be considered to store copies of each packet seen on a network and compare the contents thereof to determine duplicates, this would require large amounts of memory to store the packets and many processing cycles to perform the comparison. The requirements become greater as network speeds increase, making such method undesirable.

A software-calculated hash over the contents of each packet could reduce the memory requirements to perform such comparison, but would but do little to reduce the processing cycles required.

SUMMARY OF THE INVENTION

In accordance with the invention, an apparatus and method of detecting duplicate packets is provided, whereby the duplicate packets may be discarded.

Accordingly, it is an object of the present invention to provide an improved method and apparatus for network test and measurement.

It is a further object of the present invention to provide an improved method and apparatus for detecting and discarding duplicate packets seen on multiple ports.

It is yet another object of the invention to eliminate these "duplicate" packets seen on multiple ports of a network analyzer in a manner that minimizes execution time.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a method and apparatus to detect and discard duplicate packets in a network test instrument.

Figure 1:
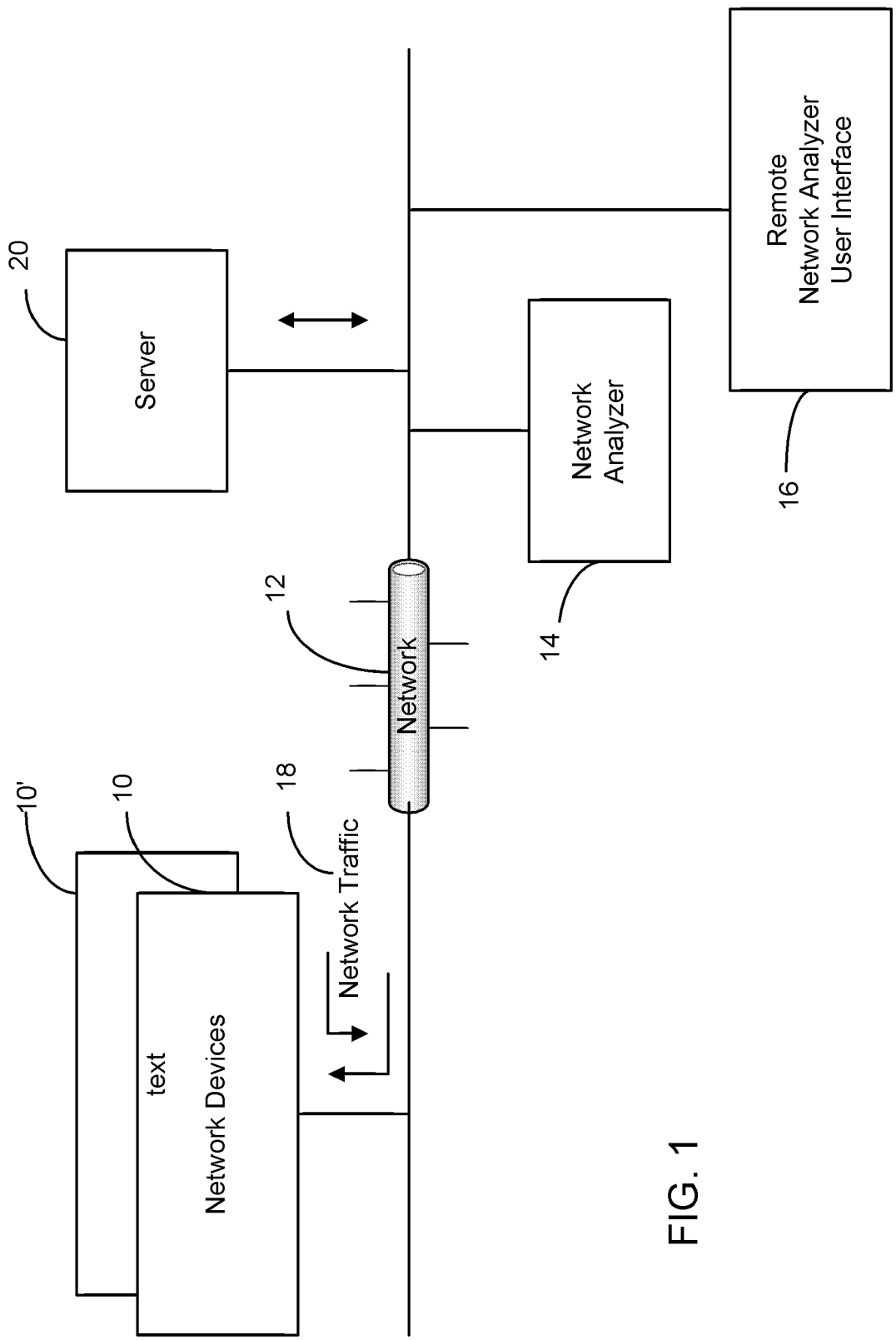
FIG. 1 is a block diagram of a network with a test instrument installed thereon.

Referring to FIG. 1, a block diagram of a network with an apparatus in accordance with the disclosure herein, a network may comprise plural network devices 10, 10', etc., which communicate over a network 12 by sending and receiving network traffic 18. The traffic may be sent in packet form, with varying protocols and formatting thereof.

A network analyzer 14 is also connected to the network, and may include a remote network analyzer interface 16 that enables a user to interact with the network analyzer to operate the analyzer and obtain data therefrom remotely from the physical location of the analyzer.

The network analyzer comprises hardware and software, CPU, memory, interfaces and the like to operate to connect to and monitor traffic on the network, as well as performing various testing and measurement operations, transmitting and receiving data and the like. The remote network analyzer typically is operated by running on a computer or workstation interfaced with the network.

Figure 2:
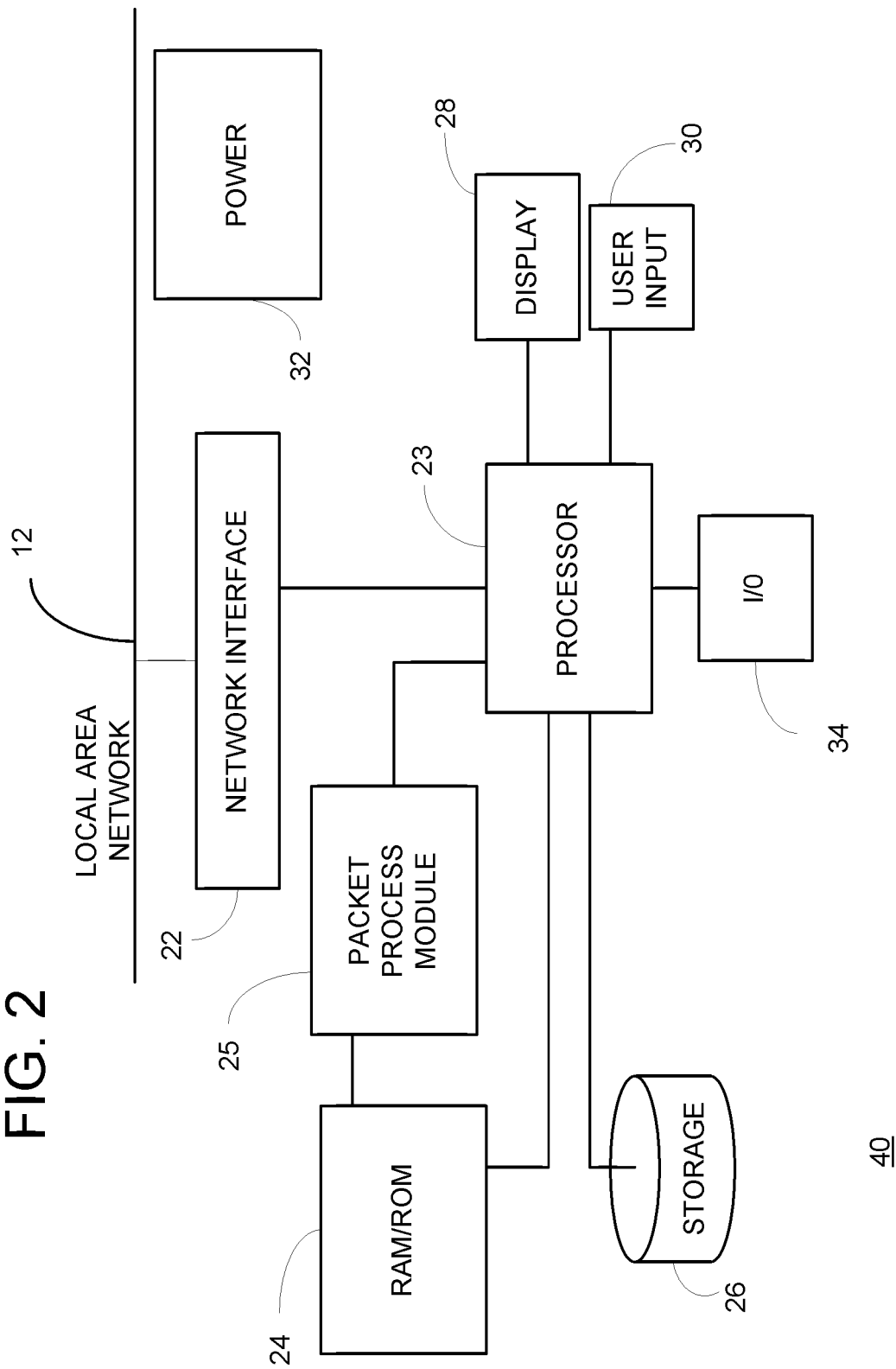
FIG. 2 is a block diagram of a test instrument.

FIG. 2 is a block diagram of a test instrument/analyzer 40, wherein the instrument may include network interfaces 22 which attaches the device to a network 12 via multiple ports, one or more processors 23 for operating the instrument, memory such as RAM/ROM 24 or persistent storage 26, display 28, user input devices 30 (such as, for example, keyboard, mouse or other pointing devices, touch screen, etc.), power supply 32 which may include battery or AC power supplies, other interface 34 which attaches the device to a network or other external devices (storage, other computer, etc.). Packet processing module 25 provides processing of packets to assist in the duplicate detection and discard, as discussed further hereinbelow. Memory 24 is accessible to module 25 for transfer of data.

In operation, the network test instrument is attached to the network, and observes transmissions on the network to collect statistics thereon.

Packet processor module 25, which may be implemented as a FPGA, for example, observes incoming packet data received on the network, and calculates two hashes ('hashA' and 'hashB') on octets contained in the packets that would be sufficient to determine uniqueness, and maintains a high-resolution timestamp relative to the packet data. In a particular embodiment, determination of the hashes comprise discarding the MAC frame and CRC of each packet, and determining the hashes on data portions that include packet length and content. As each packet arrives on the network, module 25 writes the hashes, the packet data, and its arrival timestamp to memory.

Meanwhile, a software module is operating and maintains a fast lookup table whose entries contain the hashes with their corresponding packet timestamps. For each packet, software uses 'hashA' as an index into the table. Entries at the table index are compared against the 'hashB'. If not found, 'hashB' is added to an available entry at the table index with its corresponding timestamp and the packet is passed for further analysis. If an entry is found for 'hashB', the corresponding timestamps are compared against a pre-determined period. If within the period, the packet is deemed duplicate and discarded, otherwise 'hashB' entry's corresponding timestamp is updated and the packet is passed for further analysis.

The hash comprises a unique signature for each packet, for example, a 64 bit value. For an incoming packet in accordance with a particular embodiment, the source and destination MAC (12 bytes) at the beginning of the packet is discarded. Also, the end CRC data (4 bytes) is discarded as well. A rolling hash value is calculated on the remaining data, and the resultant value, data and time stamp are placed into memory.

Software maintains a fast lookup table whose entries contain the hardware-calculated hashes with their corresponding packet timestamps. For each packet, the software uses the least-significant 16-bits of the hardware-calculated hash as an index into this table. Entries at the table index are compared against the full hardware-calculated hash for a match.

If no match found, the packet is deemed not a duplicate. The hash and its corresponding timestamp are added to an available entry at the table index. The packet passes for further analysis.

If a match is found, the corresponding timestamps are then compared. If the timestamps are within a given time, for example, 50 ms, the packet is deemed duplicate and discarded. Otherwise, the packet is deemed not a duplicate, the entry's corresponding timestamp is updated and the packet is passed for further analysis.

When a duplicate packet is discarded, the next packet from memory is tested in the same manner for duplicate. This continues until a non-duplicate packet is encountered or no more packets are available from server memory.

Duplicate packet detection is performed across all physical Ethernet interfaces within a logical channel, but not across logical channels. This is to maintain correct flow/transaction layer analysis in the event that the user splits the same logical traffic across the configured logical interfaces.

Figure 3:
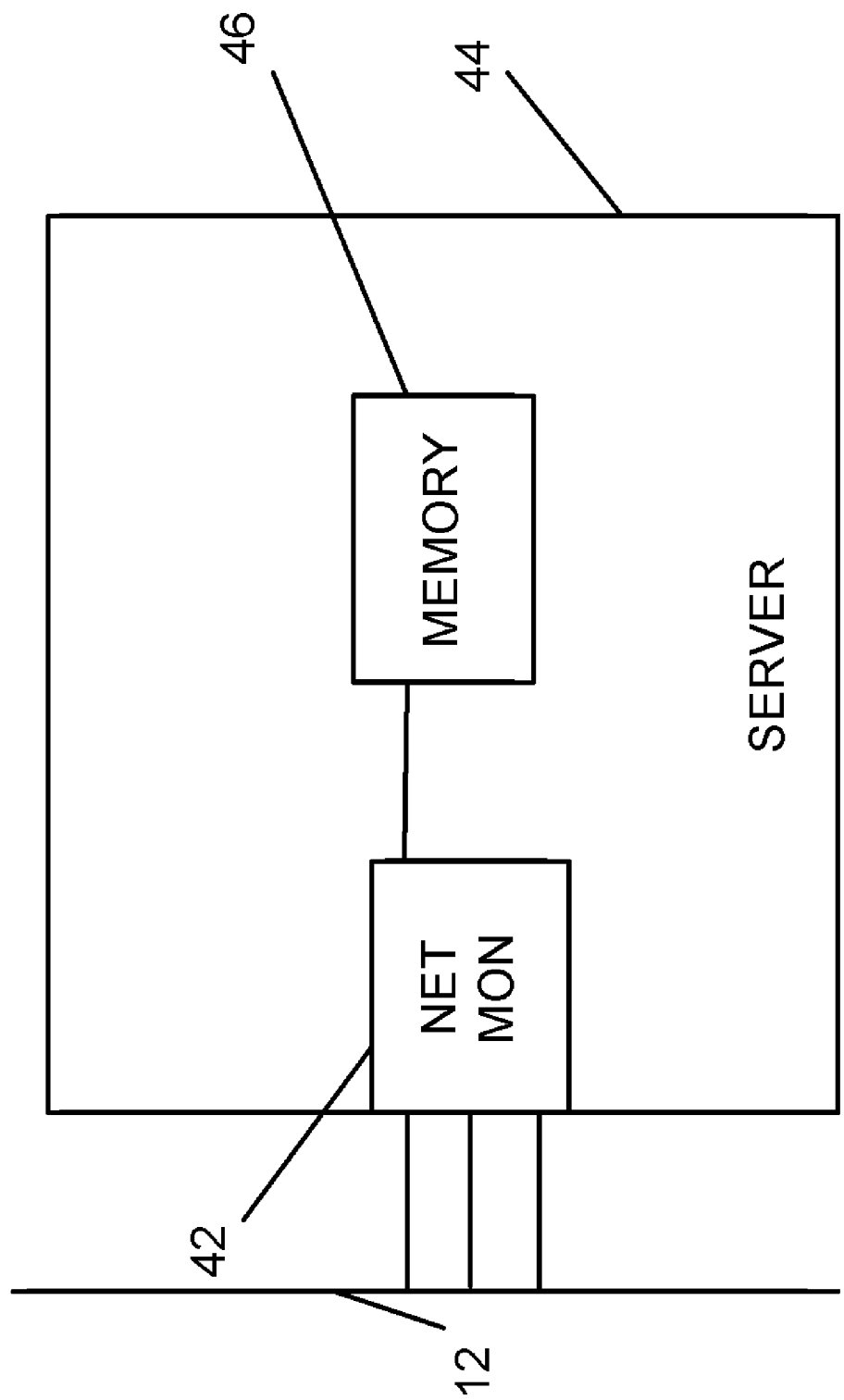
FIG. 3 is a block diagram of an implementation of the apparatus and method.

Referring to FIG. 3, the method and apparatus may suitably be implemented as a network monitoring card 42 that plugs into a PCIe slot in a high-performance server 44, to filter, aggregate, and buffer Ethernet traffic from network 12 over multiple ports at line rates, and a device driver. Packet, hash and time stamp data from the card 42 is supplied via DMA to the server memory 46. The device driver operating on the server is called to obtain network packet data, wherein when called to read a next packet data from the server memory, the device driver implements the above-discussed checking to determine if a packet is duplicate, discarding duplicates and passing non-duplicates on to the requesting process or devices in response to the read request.

Thus, in accordance with the method and apparatus, detection and discard of duplicate data packets is enabled, to provide more accurate network analysis by a network test instrument.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for duplicate packet detection and discard, comprising:
    for multiple incoming packet data, determining a first hash value of at least a portion of a packet and a timestamp and determining a second hash value of at least the portion of the packet; and
    employing the determined first hash value as an index to a table and comparing the determined second hash value to a determined third hash value of data stored at a table entry at a table location determined by the index;
    if no match is found, storing the determined second hash value of at least the portion of the packet and the timestamp as data at the table entry at the table location determined by the index, but if a match is found, comparing the timestamp of the table entry and the timestamp of the incoming packet data, and if the timestamps are within a time value of each other, determining that the packet data is a duplicate, otherwise, if the timestamps are not within the time value, determining that the packet data is not a duplicate, and storing the timestamp at the table entry and passing the incoming packet data on for further use.

2. The method according to claim 1, wherein at least one of said hash values comprise a hash value of a portion of the packet other than a MAC frame.

3. The method according to claim 1, wherein at least one of said hash values comprise a hash value of a portion of the packet other than a CRC portion of the packet.

4. The method according to claim 1, wherein at least one of said hash values comprise a hash value of a portion of the packet other than a MAC frame and a CRC portion of the packet.

5. The method according to claim 1, wherein at least one of said hash values comprise a hash value of a portion of the packet sufficient to provide a unique identification of the packet.

6. The method according to claim 1, wherein at least one of said hash values comprise a hash value of a sufficient number of octets of the packet sufficient to provide a unique identification of the packet.

7. An apparatus for duplicate packet detection and discard, comprising:
    a network interface for connecting to and observing traffic on a network;
    a processor;
    a storage medium for storing data;
    wherein said processor observes multiple incoming packet data via said network interface, determines a first hash value of a packet, a second hash value of the packet, and a timestamp and stores said first hash value, said second hash value, said timestamp and said packet data; and
    a device driver, wherein, in response to a request for packet data, said device driver obtains a stored packet data from said storage medium, employs at least a portion of the first hash value as an index to a table and comparing a third hash value of any data stored at a table entry stored at a table location addressed by the index with said second hash value;
    if no match is found, storing the second hash value and said timestamp and packet data as the table entry at the table location addressed by the index, but if a match is found, comparing the timestamp stored as the table entry at the table location addressed by the index and the timestamp of the requested packet data, and if the timestamps are within a time value of each other, determining that the packet data is a duplicate, otherwise, if the timestamps are not within the time value, determining that the packet data is not a duplicate, and storing the timestamp of the requested packet data as the table entry at a table location addressed by the index and passing the requested packet data on for further use.

8. The apparatus according to claim 7, wherein at least one of said hash values comprise a hash value of a portion of the packet other than a MAC frame.

9. The apparatus according to claim 7, wherein at least one of said hash values comprise a hash value of a portion of the packet other than a CRC portion of the packet.

10. The apparatus according to claim 7, wherein at least one of said hash values comprise a hash value of a portion of the packet other than a MAC frame and a CRC portion of the packet.

11. The apparatus according to claim 7, wherein at least one of said hash values comprise a hash value of a portion of the packet sufficient to provide a unique identification of the packet.

12. The apparatus according to claim 7, wherein at least one of said hash values comprise a hash value of a sufficient number of octets of the packet sufficient to provide a unique identification of the packet.

13. The apparatus according to claim 7, wherein said apparatus is implemented as a network monitoring card.

14. The apparatus according to claim 13, wherein network monitoring card comprises a PCIe interface.

15. An apparatus for duplicate packet detection and discard, comprising:
- a server computer, said server comprising
  - a network interface for connecting to and observing traffic on a network;
  - a processor;
  - a storage medium for storing data;
  - wherein said processor observes multiple incoming packet data via said network interface, determines a first hash value of a packet, a second hash value of the packet data, and an incoming timestamp and stores said first hash value, said second hash value, said incoming timestamp and packet data; and
- a device driver, wherein, in response to a request for packet data, said device driver obtains a packet from said storage medium, employs at least a portion of the first hash value as an index to a table and comparing a third hash value of any data stored at a table entry stored at a table location addressed by the index with the second hash value;
- if no match is found, storing the second hash value and incoming timestamp and packet data at the table location addressed by the index, but if a match is found, comparing a stored timestamp stored at the table at the table location addressed by the index and the incoming timestamp, and if the incoming and stored timestamps are within a time value of each other, determining that the packet data is a duplicate, otherwise, if the incoming and stored timestamps are not within the time value, determining that the packet data is not a duplicate, and storing the incoming timestamp as the stored timestamp table entry at the table location addressed by the index and passing the requested packet data on for further use.

16. The apparatus according to claim 15, wherein said hash values comprise a hash value of a portion of the packet other than a MAC frame.

17. The apparatus according to claim 15, wherein said hash values comprise a hash value of a portion of the packet other than a CRC portion of the packet.

18. The apparatus according to claim 15, wherein said hash values comprise a hash value of a portion of the packet other than a MAC frame and a CRC portion of the packet.

19. The apparatus according to claim 15, wherein said hash values comprise a hash value of a portion of the packet sufficient to provide a unique identification of the packet.

20. The apparatus according to claim 15, wherein said hash values comprise a hash value of a sufficient number of octets of the packet sufficient to provide a unique identification of the packet.

* * * * *